(12) United States Patent
Spruill et al.

(10) Patent No.: US 12,679,267 B2
(45) **Date of Patent: \*Jul. 14, 2026**

(54) CARGO RETAINING SYSTEM

(71) Applicant: RAD Straps LLC, Saint Petersburg, FL (US)

(72) Inventors: Jeramie Spruill, Saint Petersburg, FL (US); William Jay Beck, Madeira Beach, FL (US)

(73) Assignee: RAD Straps LLC, Saint Petersburg, FL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/451,090

(22) Filed: Jan. 16, 2026

(65) Prior Publication Data

US 2026/0138521 A1     May 21, 2026

Related U.S. Application Data

(63) Continuation of application No. 18/351,265, filed on Jul. 12, 2023, now Pat. No. 12,594,871.

(60) Provisional application No. 63/388,363, filed on Jul. 12, 2022.

(51) Int. Cl.
B60P 7/00        (2006.01)
B60P 7/08        (2006.01)

(52) U.S. Cl.
CPC ........... B60P 7/0846 (2013.01); B60P 7/0807 (2013.01)

(58) Field of Classification Search
CPC ....... B60P 7/0823; B60P 7/083; B60P 7/0838; B60P 7/0846; B60P 7/0807

USPC ......................................................... 410/100
See application file for complete search history.

(56) References Cited

U.S. PATENT DOCUMENTS

| | | | | |
|---|---|---|---|---|
| 4,257,570 A | * | 3/1981 | Rasmussen ........... | B60P 7/0807 |
| | | | | 248/503 |
| 5,338,136 A | | 8/1994 | Hetchler | |
| 6,039,520 A | * | 3/2000 | Cheng ................... | B60P 7/0807 |
| | | | | 410/106 |
| 6,113,328 A | * | 9/2000 | Claucherty ........... | B60P 7/0807 |
| | | | | 410/116 |
| 6,139,235 A | | 10/2000 | Vander Koy et al. | |
| 7,909,553 B2 | | 3/2011 | Snyder | |
| 8,690,502 B1 | | 4/2014 | Huang | |
| 8,882,419 B2 | | 11/2014 | Aguirre et al. | |
| 9,884,580 B2 | | 2/2018 | Hemphill | |
| 10,343,587 B2 | * | 7/2019 | Frazier ................. | B60P 7/0815 |

(Continued)

*Primary Examiner* — Steven O Douglas
(74) *Attorney, Agent, or Firm* — ICE MILLER LLP; Justin D. Swindells

(57) ABSTRACT

A cargo retaining system adapted to be mounted on a vehicle bed including: a mounting plate adapted to be placed on a side wall of the vehicle bed; a tie-down hook secured to an opposite side wall of the vehicle bed; a ratchet strap device secured to the mounting plate; a plurality of holes located around the perimeter of the mounting plate; a plurality of orifices located in the central region of the mounting plate. The tie-down hook includes a flat section and a bended section. The flat section includes a plurality of perforations. The bended section includes a plurality of holes and the ratchet strap device includes a strap having a first end secured to the ratchet strap device and a free end with a hook that connects and disconnects to the plurality of holes of the bended section of the tie-down hook.

20 Claims, 4 Drawing Sheets

(56)            References Cited

U.S. PATENT DOCUMENTS

| 10,933,796 | B2 | 3/2021 | Beenen |
| 2020/0031269 | A1 | 1/2020 | Chu |

* cited by examiner

CARGO RETAINING SYSTEM

CROSS-REFERENCE TO RELATED APPLICATIONS

This application is a continuation of U.S. application Ser. No. 18/351,265, filed Jul. 12, 2023, now allowed, which claims the benefit of U.S. Provisional Application No. 63/388,363, filed Jul. 12, 2022, which are incorporated herein in their entirety.

FIELD OF THE INVENTION

The present invention relates to cargo retaining systems that can be disposed within vehicles, and more specifically, to a rotatable and automatically retractable cargo retaining system that can be attached to a vehicle bed.

BACKGROUND OF THE INVENTION

A plurality of devices have been used to retain cargo within the bed of the vehicle (e.g., pickup trucks). The prior art shows the use of horizontal bars mounted by the size of the bed. In addition, the prior art shows tie-down anchors mounted on a bottom or side wall of the box of the truck, that along with a strap, ratchet strap, ropes, nets, chains, or bungee cords, allow to retain the cargo during transport.

Unfortunately, the known cargo retaining devices are not adjustable in all directions to accommodate cargo items of different sizes. Furthermore, the known cargo retaining devices do not have enough strength to support the movement and vibration produced during the transport of the cargo.

There is a need for a cargo retaining system, that the deficiencies of the known systems allow to accommodate cargo items of different sizes and shapes, and in addition, a system that rotates to accommodate the orientation or configuration of the cargo.

SUMMARY OF THE INVENTION

A cargo retaining system adapted to be mounted on a vehicle bed including: a mounting plate adapted to be placed on a side wall of the vehicle bed; a tie-down hook secured to an opposite side wall of the vehicle bed; a ratchet strap device secured to the mounting plate; a plurality of holes located around the perimeter of the mounting plate; a plurality of orifices located in the central region of the mounting plate. The tie-down hook includes a flat section and a bended section. The flat section includes a plurality of perforations. The bended section includes a plurality of holes and the ratchet strap device includes a strap having a first end secured to the ratchet strap device and a free end with a hook that connects and disconnects to the plurality of holes of the bended section of the tie-down hook.

DETAILED DESCRIPTION OF THE INVENTION

Figure 1:
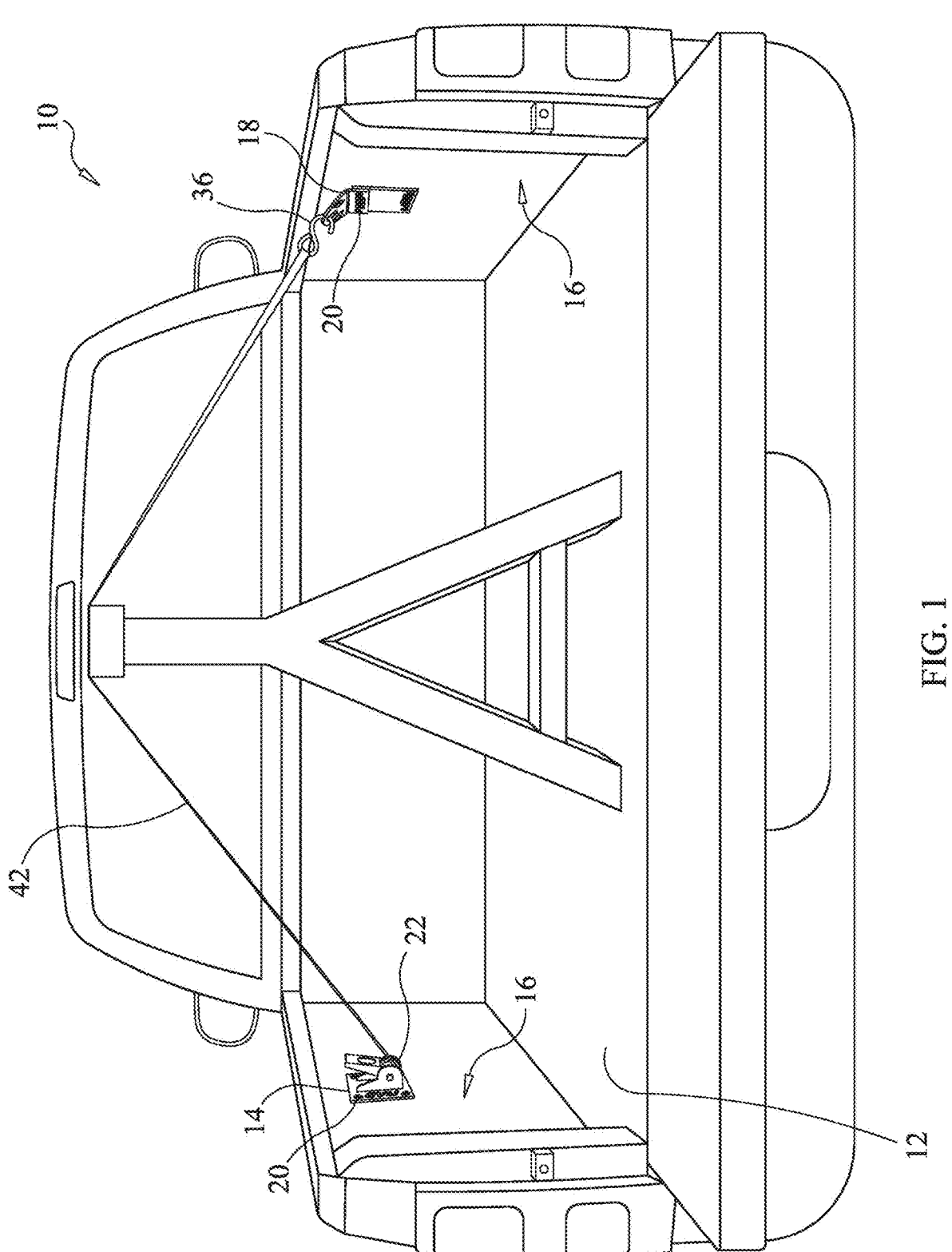
FIG. 1 is a view of a truck box that includes a cargo retaining system, according to the present invention, showing the mounting plates and the ratchet tie-down device.

The present invention includes a cargo retaining system 10 adapted to be mounted on a vehicle bed 12. The cargo retaining system 10 includes:

a mounting plate 14 adapted to be placed on a side wall 16 of the vehicle bed 12;

a tie-down hook 18 secured to a side wall 16 of the vehicle bed 12; and a ratchet strap device 22 secured to the mounting plate 14, the ratchet strap device 22 includes a strap 42 having a first end secured to the ratchet strap device 22 and a free end with a hook 36 that connects and disconnects to the tie-down hook 18.

Figures 2, 3, 4:
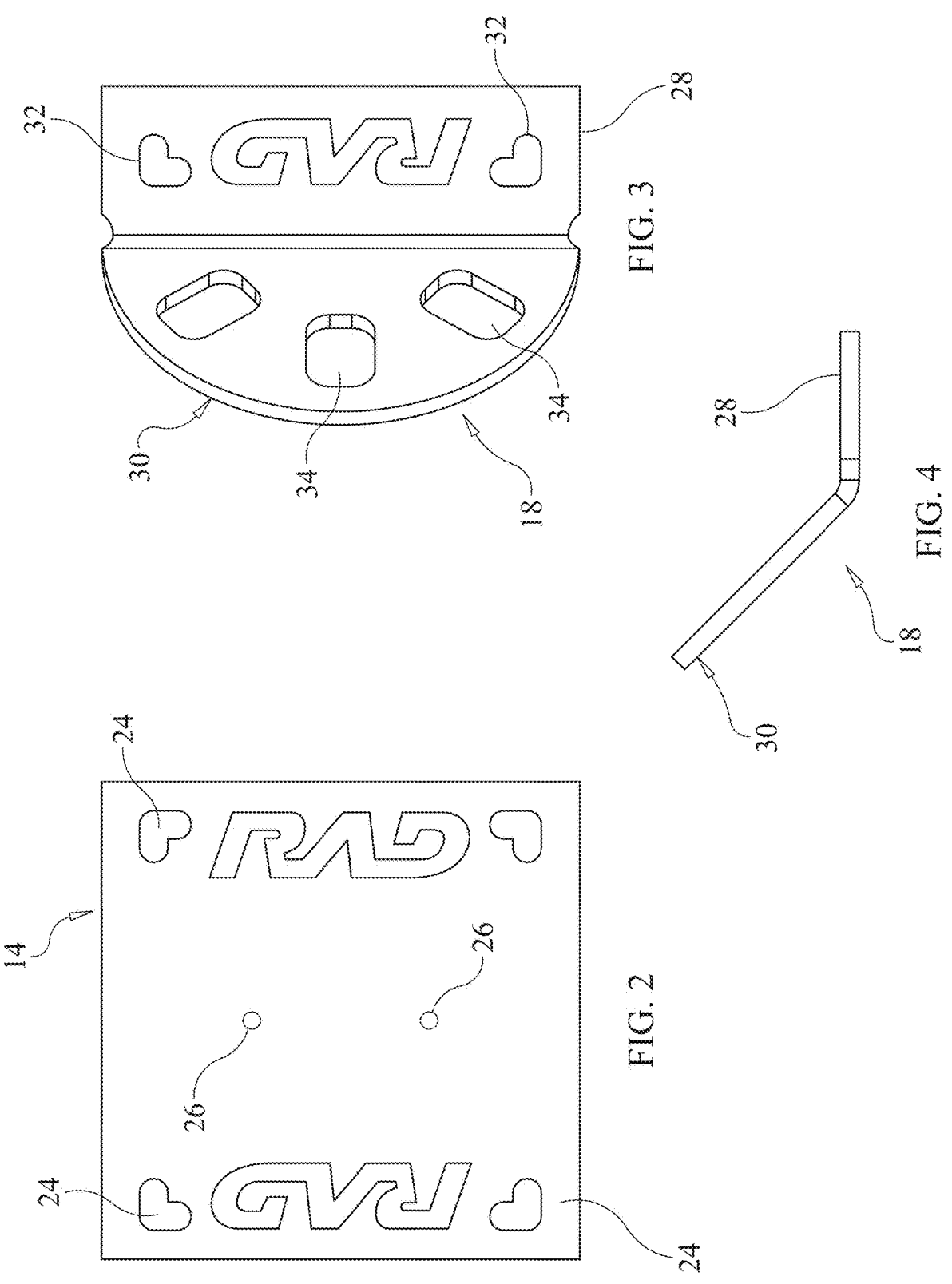
FIG. 2 shows a front view of a mounting plate, according to the present invention.
FIG. 3 shows a front view of the tie-down hook, according to the present invention.
FIG. 4 shows a side view of the tie-down hook of FIG. 3.

FIG. 2 shows the mounting plate 14 according to the present invention. The mounting plate 14 provides a rigid surface to mount the ratchet tie-down 22 to prevent it from slipping.

The mounting plate 14 is made from a hard, rigid material, such as steel, aluminum, or titanium. In one embodiment, the mounting plate 14 is made of carbon steel (ASTM A36) or 11 or 14 gage steel.

The mounting plate 14 may have a different shape, such as square, circular, ovular, rectangular, hexagonal, pentagonal, octagonal, or triangular.

In a preferable embodiment, the mounting plate 14 has a width between 3-5 inches, preferably 5 inches; a length between 3-5 inches, preferably 5 inches; and a thickness between 0.15 to 0.25 inches, preferably 0.187 of an inch. In addition, different dimensions may be used depending on the type of cargo.

The mounting plate 14 may be formed as a one-piece unitary component.

A plurality of holes 24 are located around the perimeter of the mounting plate 14. The holes 24 may have different shapes, for example, a circular shape, an oval shape, a square shape, a rectangular shape, or heart shape. In one embodiment, the holes 24 have a heart shape. This can allow accommodation of cargo of different sizes and shapes, and provides a system that rotates to accommodate the orientation or configuration of the cargo.

A plurality of orifices 26 are located in the central region of the mounting plate 14. The orifices 26 have a diameter between 0.15 to 0.25 inches, preferably 0.187 of an inch, but can have a different diameter in different embodiments.

The gage, material, size, number of holes, and/or hole placement may differ, depending on the specific type of cargo.

The mounting plate 14 is secured to the side wall 16 by using fasteners 20. The fasteners may be thumb screws, nuts, bolts, welds, or rivets. The fasteners pass through the holes 24 and the mounting plate 14 to secure the mounting plate 14 to the side wall 16 of the vehicle bed 12.

The ratchets are connected to the mounting plate by fasteners, for example, bolts, nuts, or screws.

The user may change the orientation of the system 10 to accommodate the configuration of the cargo. The system 10 is detached from the side walls by removing the fasteners and then orientation of the mounting plate and the rachet is rotated to the desire direction.

FIG. 3 shows the tie-down hook 18 according to the present invention.

The tie-down hook 18 is made from a hard, rigid material, such as steel, aluminum, or titanium. In one embodiment, the mounting plate 14 is made of carbon steel (ASTM A36) or 11 or 14 gage steel.

The tie-down hook 18 includes a flat section 28 and a bended section 30. The bended section 30 bends between a 30-55-degree angle with regards to the flat section, preferably a 45-degree angle. The tie-down hook 18 may be formed as a one-piece unitary component.

The flat section 28 includes a plurality of perforations 32. The perforations 32 may have different shapes, for example, a circular shape, an oval shape, a square shape, a rectangular shape, or heart shape. In one embodiment, the perforations 32 have a heart shape.

Figure 5:
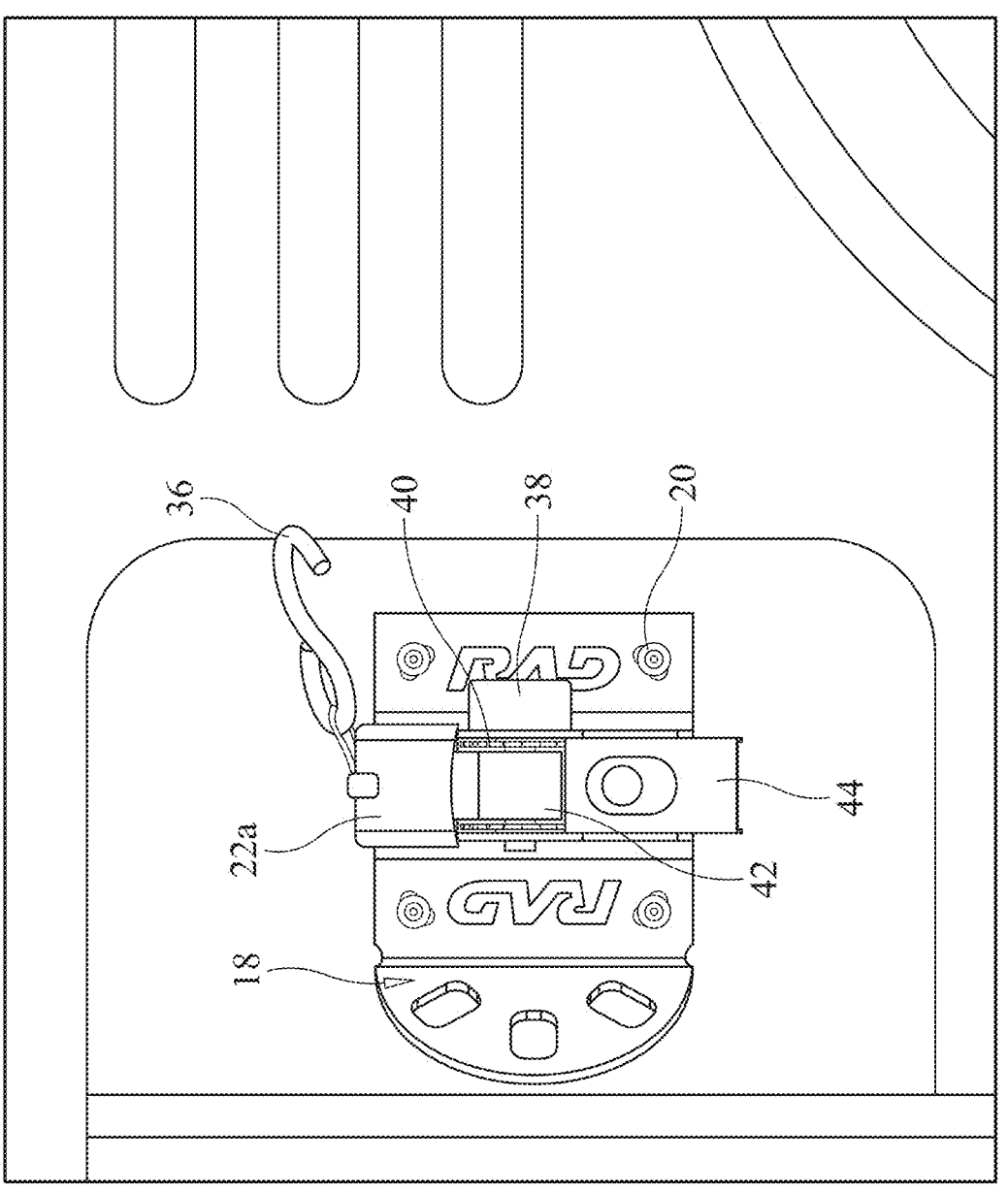
FIG. 5 shows a detailed front view of the cargo system, according to the present invention, showing the ratchet tie-down device.
Figure 6:
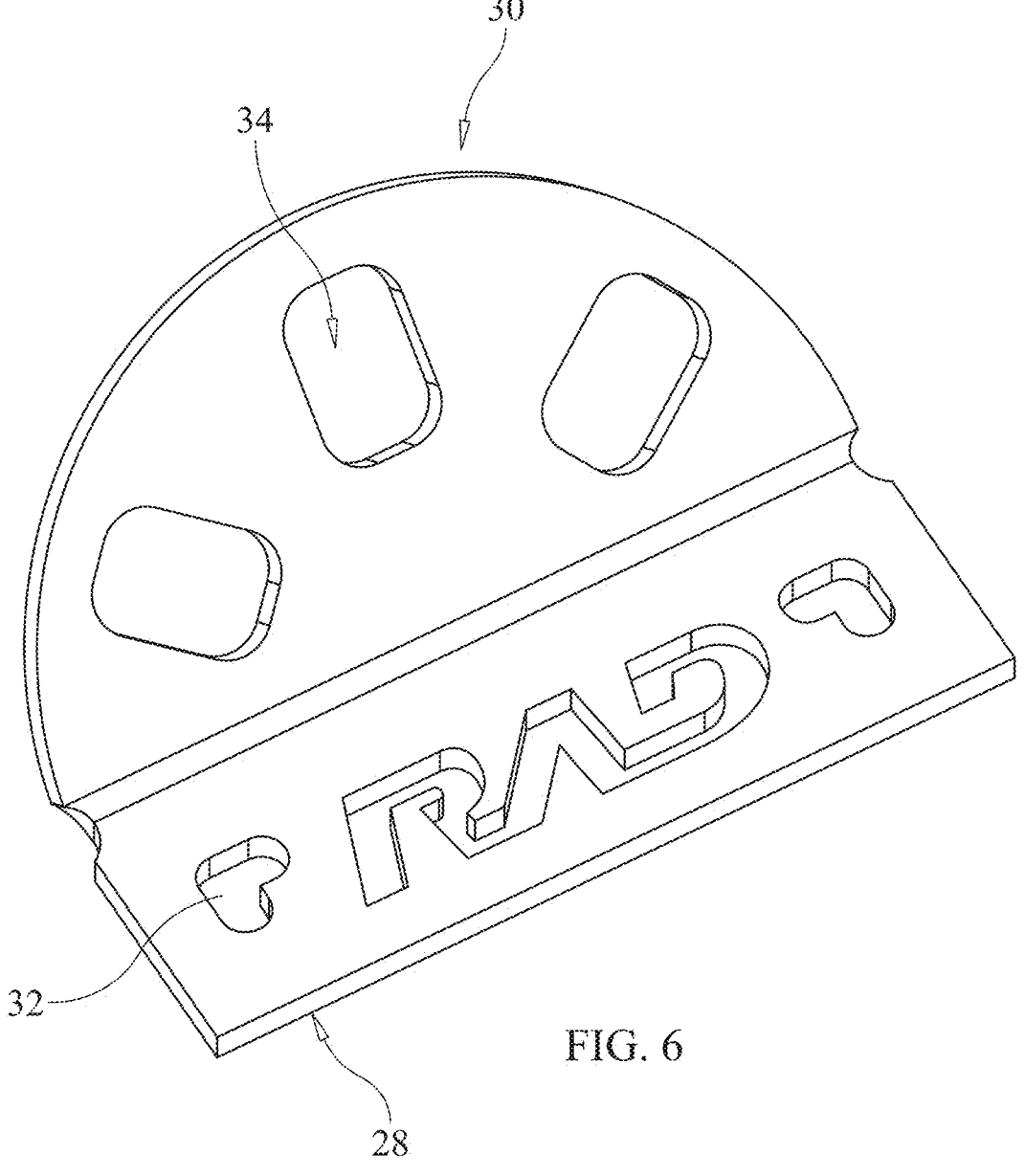
FIG. 6 shows a perspective front view of the tie-down hook of FIG. 3.

The flat section 28 is secured into the side wall 16 by aligning the perforations 32 of the flat section 22 and the hole (not shown) on the side wall 16 and then passing a fastener 20 (FIG. 5).

The bended section 30 may have different shapes, for example, circular, semi-circular, rectangle, or square. In one embodiment, the bended section 30 has a semi-circular shape.

The bended section 30 includes a plurality of holes 34. The holes 34 may have different shapes, for example, a circular shape, an oval shape, a square shape, a rectangular shape, or heart shape. In one embodiment, the holes 34 have a heart shape. The holes 34 are shaped and sized to connect and secure the hook 36 from the ratchet strap device 22.

In one embodiment, according to the present invention, the system 10 may include a ratchet strap device 22a secured to the tie-down hook 18 in addition to the ratchet strap device 22 secured to the mounting plate 14. FIG. 5 shows a ratchet strap device 22a secured to the tie-down hook 18.

The ratchet strap device 22 and the ratchet strap device 22a may be the same or different types of ratchet strap devices.

The ratchet strap devices 22, 22a may include a housing 38 to be mounted into the mounting plate 14 or the tie-down hook 18; a shaft (not shown) extending through the housing, a spool 40 supported on the shaft within the housing 38, a strap 42 is coiled around the shaft and includes a fixed end attached to the spool 40 and a free end having a hook 36 adapted to attach to the holes 34 of the bended section 30 of tie-down hook 18 of the same system 10 or of a different cargo retaining system.

The strap 42 may be a flexible fabric or other suitable material.

The ratchet strap devices 22, 22a work as a normal ratchet strap. The strap 42 extends from and retracts from the housing 38 through operation of at least one ratchet lever 44.

The retraction of the strap 42 may be manual or automatic.

In an embodiment, the retraction of the strap is automatic and the housing includes a strap-return mechanism (not shown) including a biasing member having a first portion fixed to the housing and a second portion fixed to the shaft.

The bending section 30 allows the user to quickly connect and disconnect the hook 36 of the strap from another cargo system.

In order to use the cargo system 10, after the system 10 has been secured into the side wall of the truck bed, the user just pulls the strap 42 of a first cargo system and then secures the hook 36 into the holes 34 of the bended section 30, the same cargo system 10 or of a second cargo system.

The present invention also contemplates a universal kit for the user to self-install the cargo system 10 in any truck. The kit may allow the user to mount the system 10 in any model truck, where the manufacturer does not include screw holes in the cargo area.

The universal kit includes:

at least one cargo system, each cargo system including:
a mounting plate having a plurality of holes located around the perimeter of the mounting plate and a plurality of orifices that are located in the central region of the mounting plate;
a tie-down hook, the tie-down hook includes a flat section and a bended section, the flat section includes a plurality of perforations;
optionally at least one ratchet strap device;
a plurality of fasteners;
a ratchet strap device;
a plurality of rivet nuts or jack nuts; and
optionally, a rivet nut tool.

To use the universal kit in a truck without having the manufactured holes in the truck bed, the user may drill holes in the desired location to install the mounting plate, place the plurality of rivet nuts or jack nuts in the drilled holes, and then pass the fasteners through the holes of the mounting plate to secure the mounting plate in the desired location.

In one embodiment, the kit may use a rivet nut tool having, for example, a ¼-20 thread.

The cargo retaining system 10, according to the present invention, can be rapidly and easily mounted to an existing truck bed by the user.

The cargo retaining system 10 can be installed on pickup trucks, as illustrated in the figures. However, it is also contemplated that the cargo retaining system 10 can be installed in vehicles other than pickup trucks, such as sport utility vehicles, sedans, vans, coupes, transportation vehicles, boats, motorcycles, trailers, and other similar vehicles.

The foregoing description of illustrative embodiments has been presented for purposes of illustration and of description. It is not intended to be exhaustive or limiting with respect to the precise form disclosed, and modifications and variations are possible, in light of the above teachings or may be acquired from practice of the disclosed embodiments.

What is claimed is:

1. A retaining system adapted to be mounted to a cargo area of a vehicle, comprising:
a mounting plate adapted to be placed on a side wall of the cargo area, the mounting plate having a perimeter and a central region and a plurality of holes;
a ratchet strap device configured to be secured to the mounting plate;
a tie-down hook having a bended section that is bended at an angle between 30-55 degrees relative to the mounting plate, the bended section having a hole,
wherein the ratchet strap device includes a strap having a first end secured to the ratchet strap device and a free end with a hook configured to connect to and disconnect from the hole of the bended section of the tie-down hook.

2. The retaining system of claim 1, wherein the ratchet strap device is rotatable to accommodate an orientation or configuration of cargo in the cargo area.

3. The retaining system of claim 1, wherein the system also provides a system that rotates to accommodate an orientation or configuration of cargo.

4. The retaining system of claim 1, wherein the angle is 45 degrees.

5. The retaining system of claim 1, wherein the tie-down hook is configured to be secured to an opposite side wall of the cargo area.

6. The retaining system of claim 5, further comprising a second ratchet strap device secured to the tie-down hook.

7. The retaining system of claim 1, wherein the vehicle is a pickup truck, a sport utility vehicle, a sedan, a van, a coupe, a transportation vehicle, a boat, a motorcycle, or a trailer.

8. The retaining system of claim 1, wherein the mounting plate is generally flush against the side wall of the cargo area responsive to being attached thereto.

9. The retaining system of claim 1, wherein the mounting plate is generally flat.

10. The retaining system of claim 1, wherein the bended section is adjacent to the mounting plate, the bended section and the mounting plate forming an integral piece.

11. The retaining system of claim 1, wherein the bended section includes a plurality of holes, each of the plurality of holes being configured to be connected and disconnected to the hook of the ratchet strap device or another hook of another ratchet strap device.

12. The retaining system of claim 11, wherein the bended section allows quick connection and disconnection of the hook from another retaining system.

13. The retaining system of claim 1, wherein the hole of the bended section has a circular shape, an oval shape, a square shape, a rectangular shape, or a heart shape.

14. The retaining system of claim 1, wherein the mounting plate is made from steel, carbon steel, gauge steel, aluminum, or titanium.

15. A kit comprising the retaining system of claim 1 and a plurality of fasteners to secure the mounting plate to the side wall of the cargo area.

16. A kit comprising at least two retaining systems according to claim 1.

17. A vehicle comprising the retaining system of claim 1, wherein the mounting plate is attached to the side wall of the cargo area.

18. The retaining system of claim 1, wherein the ratchet strap device features automatic retraction and includes a strap-return mechanism having a biasing member.

19. The retaining system of claim 1, wherein the mounting plate has a width or a length between three and five inches, and wherein the mounting plate has a thickness between 0.15 and 0.25 inches.

20. The retaining system of claim 1, wherein the tie-down hook includes a notch or cutout at a bend of the bended section.

* * * * *